United States Patent
Humer et al.

(10) Patent No.: US 6,783,869 B2
(45) Date of Patent: Aug. 31, 2004

(54) ALUMINIUM ALLOY FOR AN ANTI-FRICTION ELEMENT

(75) Inventors: Johannes Humer, Vorchdorf (AT); Herbert Kirsch, Altmünster (AT); Markus Manner, Mauer (AT); Robert Mergen, Wels (AT)

(73) Assignee: MIBA Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 10/290,060

(22) Filed: Nov. 7, 2002

(65) Prior Publication Data

US 2003/0108765 A1 Jun. 12, 2003

(30) Foreign Application Priority Data

Nov. 7, 2001 (AT) .................................. A 1749/2001

(51) Int. Cl.$^7$ .................. B32B 15/04; C22C 21/02; C22C 21/10

(52) U.S. Cl. ................... 428/650; 428/652; 384/912; 420/532; 420/531; 420/535; 420/536; 420/537; 420/533; 420/541; 420/544; 420/547; 420/548; 420/551; 420/553

(58) Field of Search ................... 428/650, 653, 428/684, 685, 652; 384/912; 420/528, 529, 530, 531, 532, 533, 534, 535, 536, 539, 540, 541, 542, 543, 544, 546, 548, 552, 553, 554

(56) References Cited

U.S. PATENT DOCUMENTS 5,075,177 A * 12/1991 Tanaka et al. ............... 428/653
6,506,503 B1 * 1/2003 Mergen et al. .............. 428/650

FOREIGN PATENT DOCUMENTS

DE 40 15 593 12/1990
JP 406182582 * 7/1994

* cited by examiner

Primary Examiner—Jennifer McNeil
(74) Attorney, Agent, or Firm—Collard & Roe, P.C.

(57) ABSTRACT

The invention relates to an aluminium alloy for an anti-friction element containing respectively, as a % by weight, 4.2% to 4.8% Zn, 3.0% to 7.0% Si, 0.8% to 1.2% Cu, 0.7% to 1.3% Pb, 0.12% to 0.18% Mg, 0% to 0.3% Mn and 0% to 0.2% Ni. Also incorporated, based on % by weight, are 0.05% to 0.1% Zr, 0% to 0.05% Ti, 0% to 0.4% Fe, 0% to 0.2% Sn. The rest is formed by Al with the usual incidental impurities depending on the melt.

8 Claims, 2 Drawing Sheets

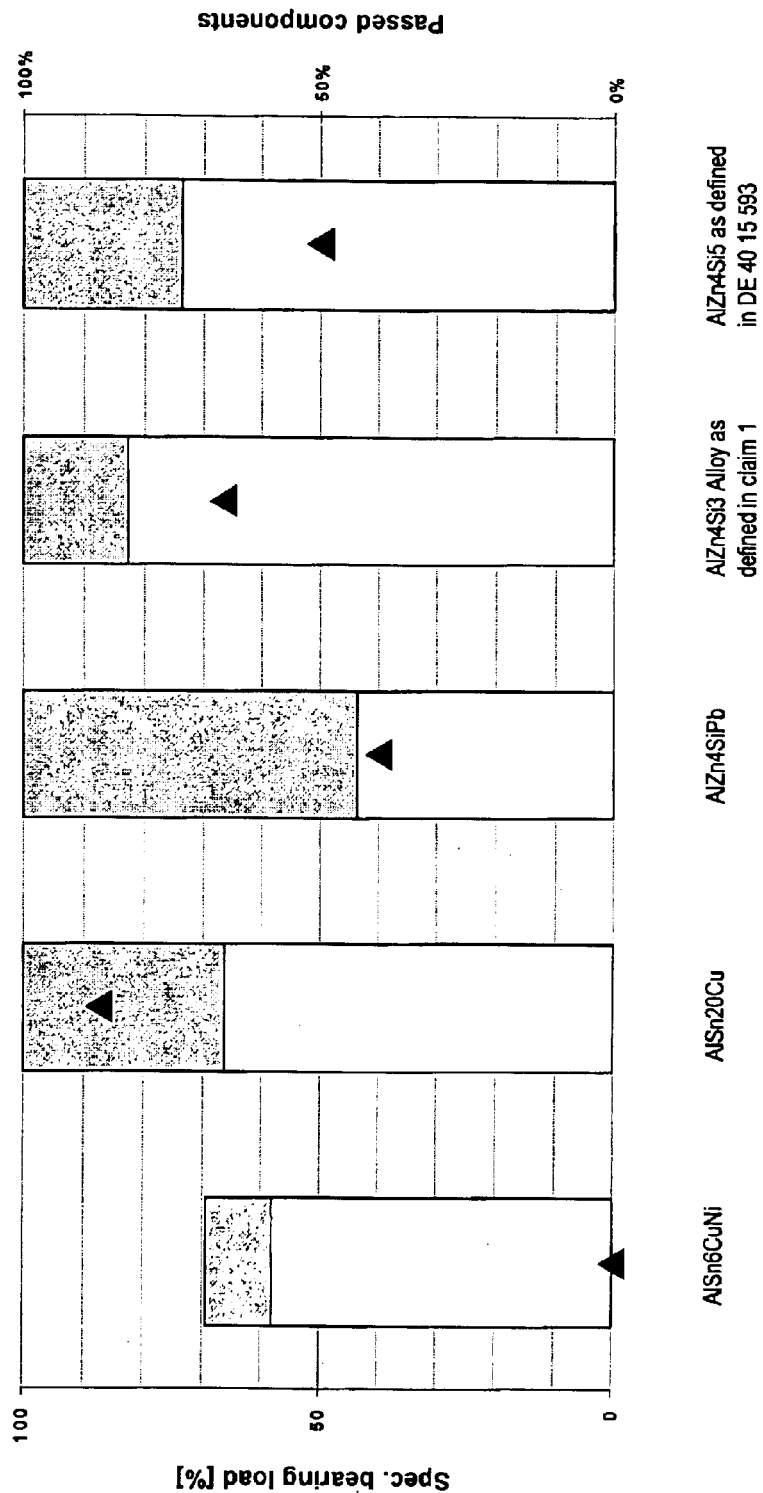

ALUMINIUM ALLOY FOR AN ANTI-FRICTION ELEMENT

BACKGROUND OF THE INVENTION

1. Field of the Invention

The invention relates to an aluminium alloy for an anti-friction element, containing respectively, as a % by weight, 4.2% to 4.8% Zn, 3.0% to 7.0% Si, 0.8% to 1.2% Cu, 0.7% to 1.3% Pb, 0.12% to 0.18% Mg, 0% to 0.3% Mn and 0% to 0.2% Ni, an anti-friction element made from an aluminium alloy, a composite material for an anti-friction element comprising a base layer, in particular made from steel, and a second layer made from an aluminium alloy disposed thereon, a method of producing an aluminium alloy for an anti-friction element in which respectively, in terms of weight, 4.2% to 4.8% Zn, 3.0% to 7.0% Si, 0.8% to 1.2% Cu, 0.7% to 1.3% Pb, 0.12% to 0.18% Mg, 0% to 0.3% Mn and 0% to 0.2% Ni are admixed with Al and the usual incidental impurities depending on the melt, as well as the use of the aluminium alloy for producing a thrust ring, an anti-friction layer of a plain bearing and a binding layer of a plain bearing.

2. The Prior Art

The technical progress made in the engine construction industry has meant that increasingly tough requirements are being placed on anti-friction elements, such as plain bearings for example. Single-layer bearings are no longer capable of meeting these requirements, for example in terms of withstanding wear caused by fretting as the film of oil becomes thinner at high speeds, and the anti-friction bearing industry is increasingly tending to look towards what are referred to as multi-layer bearings as a result. Multi-layer anti-friction elements of this type usually consist of a steel base layer, onto which one or more other layers are applied by rolling, plating, etc. These other layers include on the one hand the bearing metal layer, which might optionally have an intermediate layer of a so-called binding layer fixed to the steel supporting layer.

A plain bearing of this type is known from patent specification DE40 15 593 A1, for example. The bearing metal disclosed here has an aluminium base and, in its simplest form, consists of 1 to 10% by weight of zinc, 1 to 15% by weight of silicon, 0.1 to 5% by weight of copper, 0.1 to 5% by weight of lead, 0.005 to 0.5% by weight of strontium, the rest being aluminium and the usual incidental impurities depending on the melt. It may also contain specific proportions of nickel, magnesium, manganese, vanadium and chromium.

SUMMARY OF THE INVENTION

The underlying objective of the invention is to improve the mechanical properties of an alloy with an aluminium base and an anti-friction element so that they meet the requirements of the most modern high-performance engines.

This objective is achieved, independently, by the aluminium alloy proposed by the invention additionally containing respectively, as a % by weight, 0.05% to 0.1% Zr, 0% to 0.05% Ti, 0% to 0.4% Fe, 0% to 0.2% Sn, the rest being Al and the usual incidental impurities depending on the melt, and due to the fact that the Al alloy of the anti-friction element or composite material is made from the alloy proposed by the invention, as well as the fact that between 0.05% and 0.1% Zr, 0% to 0.05% Ti, 0% to 0.4% Fe and 0% to 0.2% Sn respectively, as a % by weight, are added and the mixture is melted. The advantage of adding zirconium is that the tensile yield strength and elongation are improved, which in turn enables the processability of this aluminium alloy to be improved. Moreover, it has surprisingly been found that by using zirconium, the proportions of the other elements of the alloy can be reduced, making the production process more economical. The lower silicon content improves both the ductility and the notch effect, whilst reducing the tendency to micro-shrinkage, thereby enabling the reject rate during production of anti-friction elements made from this aluminium alloy to be reduced. Forming adsorptive bonds with aluminium also causes inter-metallic phases to be formed between aluminium and zirconium as the aluminium alloy melt hardens, these inter-metallic phases having a grain-refining effect on the pattern and hence contributing to the tribological properties of the alloy. The separation of inter-metallic phases between zirconium and aluminium, in particular $AlZr_3$, produces a more solid bond across these inter-metallic hard phases within the matrix.

In other embodiments of the composite material, the second layer is provided as an anti-friction layer and/or binding layer of a plain bearing and/or an anti-friction layer is provided on the binding layer and is selected from a group consisting of bearing metals with an aluminium base, bearing metals with a copper base, bearing metals with a tin base, bearing alloys with a lead base, a lubricating varnish, a polymer layer, the advantages of which may be found in the detailed description given below.

BRIEF DESCRIPTION OF THE DRAWINGS

In order to provide a clearer understanding, the invention will be explained in more detail with reference to examples of embodiments and the appended drawings, it being pointed out that these are not intended to limit the scope of the invention and that modifications made to these examples based on the teaching explained below and falling within the reach of the person skilled in this field also fall within the scope of the invention. The drawings illustrate:

FIG. 2 the seizing limit load of the two-element bearing proposed by the invention compared with corresponding bearings known from the prior art.

DETAILED DESCRIPTION OF PREFERRED EMBODIMENTS

Figure 1:
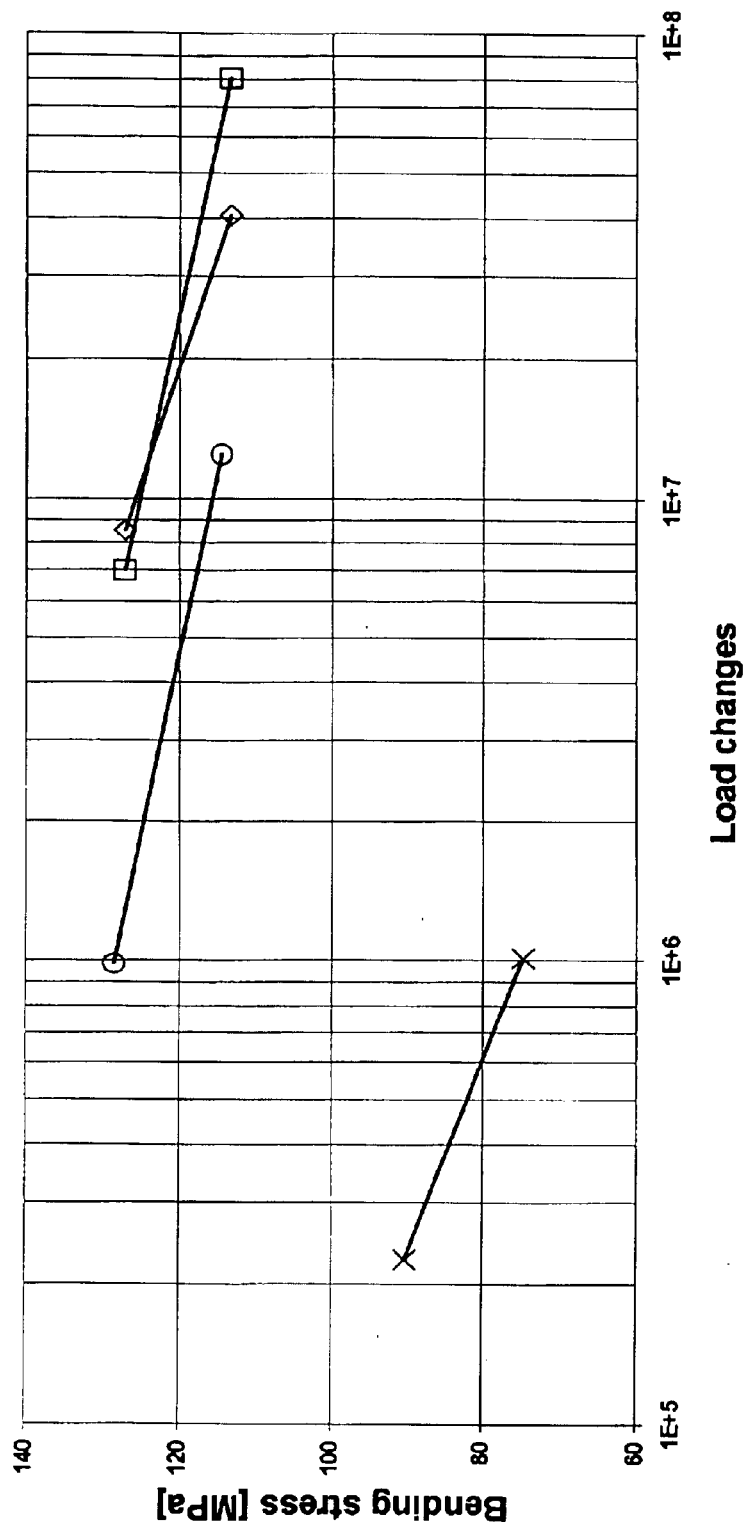
FIG. 1 the alternating bending strength of an alloy proposed by the invention in comparison with alloys known from the prior art.

Firstly, it should be pointed out that individual features or combinations of features taken from the various examples of embodiments described below may be construed as independent inventive solutions or independent solutions of the invention in their own right.

The wrought alloy with an aluminium base for an anti-friction element contains at least the following alloy elements, the figures given below representing the minimum and maximum values of the ranges of proportions of alloy elements in the alloy composition as proposed by the invention, specified as a percentage by weight.

4.2% to 4.8% zinc (Zn)
3.0% to 7.0% silicon (Si)
0.8% to 1.2% copper (Cu)
0.7% to 1.3% lead (Pb)

0.12% to 0.18% magnesium (Mg)
0.05% to 0.1% zirconium (Zr).

The rest making up 100% by weight is aluminium with the usual incidental impurities depending on the melt, such as Si, Fe, for example. Using the aluminium alloy proposed by the invention produces a so-called metallurgical aluminium with a purity grade of between 99.5 and 99.8%. Naturally, aluminium of other degrees of purity, for example ca. 95% purity, or ultra-pure aluminium may also be used.

Other embodiments of the aluminium alloy may optionally also incorporate in addition:
0% to 0.2% nickel (Ni)
0% to 0.05% titanium (Ti)
0% to 0.4% iron (Fe)
0% to 0.2% tin (Sn)
0% to 0.3% manganese (Mn)
these figures also specifying the limits for the ranges of proportions respectively as a percentage by weight, by reference to the aluminium alloy.

The elements Cu, Mg, Si and Zn are incorporated in solid solution by aluminium, causing mixed crystals with a high aluminium content to occur.

Cu or Cu and Mg form so-called hardenable wrought alloys with the Al, which can be readily formed and rolled. Cu also has the effect of strengthening the matrix due to the hardening of the mixed crystals. $Al_2Cu$ and $Al_3Zr$ are formed independently of one another, which means that there is no heterogeneous seed formation. The separation of these crystals starts virtually at the same time.

As a result of the Cu, the fatigue resistance of the aluminium alloy can be increased. The corrosion resistance of the aluminium alloy, caused for example by ingredients of the oil which have a corrosive effect, is also improved as a result.

The hardness properties of an aluminium alloy as proposed by the invention are also improved by adding Fe, resulting in hardening properties due to corresponding Al—Fe—Si phases.

Furthermore, Mg is not only absorbed by Al in solid solution but in particular forms inter-metallic compounds as a result of the addition of Si, such as $Mg_2Si$, which either precipitates or is also dissolved in Al. This duly improves the hardenability of the aluminium alloy proposed by the invention. However, the proportion of Mg should no be so great that $Al_3Mg_2$ phases are able to precipitate at the grain boundaries, which can cause inter-crystalline corrosion.

As may be seen from the binary phase diagram Al—Si, Si is almost insoluble in Al and at approximately 12.5% by weight induces a eutectic reaction whereby Si is finely distributed in the alloy, which means that a corresponding mechanical strength can be imparted to the aluminium alloy because of the hardness of the Si. Si can also be used a so-called "spacer" in a bearing element made from the alloy, e.g. for a shaft to be supported, preventing additional wear on the soft Al matrix and thus improving the load capacity of the bearing element overall. Due to the hardness of the Si grains, irregularities in the shaft to be supported can be abraded, thereby improving the capacity of the bearing to withstand wear due to seizure.

Zn has a relatively high solubility in Al and is preferably oxidised compared with Al so that the disadvantages of a hard Al oxide film are avoided. Zn also increases the compatibility of the alloy with lubricating oil. The hardenability of the alloy is improved by Zn.

Adding Pb and optionally Sn improves cutting ability and makes the aluminium alloy more resistant to wear caused by fretting. Both elements are virtually insoluble in Al in the solid state and this can therefore not be regarded as a genuine alloy in the strictest sense. The resulting effect is that Pb or Sn precipitate from the melt during cooling and are distributed through it. Consequently, the anti-friction properties, ductility and capacity to embed foreign particles in the aluminium alloy can be improved, to mention but a few properties. Replacing a proportion of the Pb with Sn has an advantage in that it can make the aluminium alloy more environmentally compatible—Pb is known to have toxic properties —and it is therefore possible to make use of the combination of the higher melting point of Pb and the advantages which can be gained as a result.

Adding Zr as proposed by the invention causes $Al_3Zr$ to form, thereby inducing hardening through inter-metallic hard phases, as a result of which, because of the Si content of the aluminium alloy, the mechanical properties are partially improved in certain regions enabling the Si content to be reduced to levels lower than those used with aluminium alloys known from the prior art, and, in turn, the notch effect induced by higher Si contents can be advantageously reduced or lowered, at least to a certain extent.

The positive side-effect obtained by adding Zr is that a grain refinement can be achieved as a result of the formation of these $Al_3Zr$ tri-aluminides, particularly in terms of the grain refinement of the Si particles.

As already explained in connection with Mg, the optional addition of Ni can in turn increase the fatigue resistance of the aluminium alloy, Ni being present in solid solution or precipitated in the form of inter-metallic compounds. Like Cu, Ni increases the heat resistance of the alloy.

A grain refinement can also be obtained by adding Ti.

Adding Mn has a hardening effect and improves resistance to corrosion. The recrystallisation temperature can therefore also be increased as a result. Furthermore, particularly if the content of Fe is low, the formation of long, brittle $Al_3Fe$ needles can be prevented because Fe is absorbed in the more preferable $Al_6Mn$ crystals that are formed.

Finally, the alloy optionally contains Fe within the specified ranges. Inter-metallic phases formed between Al and Si are able to modify the resultant Si phase and it has been found to be of advantage if Zn is added in this situation because Fe aluminides which primarily occur in needle form can be converted to more robust forms. Consequently, alloys of this type are also able to withstand even higher temperatures because aluminides with rounded shapes form fewer re-crystallisation seeds than those of a needle shape, which means that the re-crystallisation behaviour of such alloys can be optimised due to the interaction with Zr.

The aluminium alloy proposed by the invention can be produced by admixing the proportions of individual elements or their pre-alloys listed above in the solid or molten liquid state, in which case, a re-crystallisation and/or at least one rolling process can be run after melting the alloy and once the melt has cooled.

An anti-friction component was made from the aluminium alloy proposed by the invention and its alternating bending strength measured as a comparison with aluminium bearings used for this purpose known from the prior art, the results of which are set out in FIG. 1. The number of load changes is logarithmically plotted on the X axis and the bending stress in MPa is plotted on the Y axis. A comparison was made on the one hand between the aluminium alloy AlZn4Si3 proposed by the invention and AlZn4Si5 known from patent specification DE 40 15 593 A1 mentioned above, AlZn4SiPb and AlSn20Cu. The associated legend is shown in FIG. 1.

As may be seen from FIG. 1, a significant improvement was achieved with the aluminium alloy as proposed by the invention for solid bearing materials as compared with the standard alloy AlZn4SiPb in terms of alternating bending strength, which is evident from the increased number of possible load changes, before the bearing material showed signs of damage for the corresponding bending stress.

Compared with the alloy AlZn4Si5, the bearing alloy proposed by the invention exhibited a lower number of load changes for a bending stress of approximately 125 MPa due to the lower Si content. The advantage obtained by the aluminium alloy proposed by the invention over this aluminium alloy is that a load change can be a higher number of load changes can be achieved due to the lower notch effect and a higher strength because of the lower Si content.

AlSn20Cu was used in this example solely as a means of illustrating the comparison with a typical bearing material for a composite bearing, e.g. a three-layer bearing.

The aluminium alloy proposed by the invention used for the comparison documented in FIG. 1 consisted of 4.5% by weight Zn, 3.3% by weight Si, 1% by weight Cu, 1% by weight Pb, 0.15% Mg and 0.08% by weight Zr, the rest being Al with the incidental impurities which occur depending on the melt.

As mentioned above, the aluminium alloy may optionally also contain an element from a group consisting of the elements Mn, Ni, Ti, Fe and Sn in the specified proportions by weight or quantity ranges, which will further improve the alternating bending stress of the bearing material proposed by the invention. For example, the composition of the aluminium alloy in different embodiments may be as specified in the table below, the figures being given as a % by weight by reference to the aluminium alloy.

used for these two-element bearings are the alloys stipulated below, which are also listed respectively in FIG. 2 from left to right:
1. AlSn6CuNi
2. AlSn20Cu
3. AlZn4SiPb
4. AlZn4Si3 (alloy proposed by the invention with the composition above, corresponding to the first embodiment)
5. AlZn4Si5 (alloy corresponding to patent specification DE 40 15 593 A1 mentioned above).

The specific bearing load is plotted on the Y axis on a percentage basis.

The black triangles shown in FIG. 2 indicate the number of respective specimens fatigue-tested without rupture and the shaded areas the respective resultant variation range.

As is clearly evident from FIG. 2, the bearing alloy specifically being tested, designated as alloy AlSn20Cu, exhibits very good values in terms of the requisite bearing properties, both as regards variation range, i.e. a relatively narrow variation range and hence for the most part constant properties for different bearings of the same structure, and as regards the number of specimens fatigue-tested without rupture, which in this case was 88%.

Taking the pure anti-friction layer based on the two-element bearing with the AlSn6CuNi bearing layer as a basis, it is evident that whilst the variation range can be reduced using this aluminium layer, the number of specimens fatigue-tested without rupture falls to 0%, making this alloy feasible as an anti-friction layer under certain circumstances only.

|    | Zn  | Si   | Cu   | Pb   | Mg   | Mn  | Ni   | Zr   | Ti   | Fe   | Sn   | Al   |
|----|-----|------|------|------|------|-----|------|------|------|------|------|------|
| 1  | 4.2 | 3.5  | 0.9  | 1.1  | 0.14 | —   | 0.2  | 0.1  | 0.05 | —    | —    | Rest |
| 2  | 4.8 | 3.5  | 1.1  | 1.1  | 0.15 | —   | —    | 0.07 | 0.03 | 0.2  | 0.2  | Rest |
| 3  | 4.7 | 3.0  | 0.9  | 1.2  | 0.13 | 0.2 | 0.1  | 0.08 | —    | 0.3  | 0.1  | Rest |
| 4  | 4.3 | 3.3  | 0.85 | 0.9  | 0.17 | 0.1 | 0.1  | 0.1  | 0.1  | 0.4  | 0.2  | Rest |
| 5  | 4.4 | 3.0  | 0.9  | 1.3  | 0.14 | —   | 0.1  | 0.1  | —    | —    | —    | Rest |
| 6  | 4.8 | 3.35 | 1.1  | 0.7  | 0.18 | —   | 0.05 | 0.05 | 0.03 | 0.1  | 0.2  | Rest |
| 7  | 4.5 | 3.4  | 1.1  | 1.15 | 0.12 | 0.1 | 0.05 | 0.05 | 0.02 | 0.3  | 0.15 | Rest |
| 8  | 4.7 | 3.0  | 1.2  | 1.3  | 0.17 | 0.1 | —    | 0.1  | 0.05 | —    | 0.2  | Rest |
| 9  | 4.8 | 3.1  | 0.9  | 0.7  | 0.15 | 0.2 | 0.2  | 0.1  | 0.05 | 0.3  | 0.1  | Rest |
| 10 | 4.6 | 7.0  | 0.8  | 0.9  | 0.18 | 0.3 | —    | 0.1  | —    | 0.25 | 0.15 | Rest |

The examples listed above represent only a selection of possible compositions of the aluminium alloy and other compositions would also be possible within the ranges specified above.

As mentioned in the introduction, the aluminium alloy proposed by the invention may also be used to make composite materials for anti-friction elements. Composite materials of this type known from the prior art consist of a base layer, e.g. made from steel, and a first embodiment has a second layer of the aluminium alloy proposed by the invention applied thereon, intended as the anti-friction layer.

A composite material of this type in the form of an anti-friction element, in particular a plain bearing in the form of half-shells, was also made up in the form of a corresponding arrangement of a two-element bearing such as known from the prior art having a seizure limit load as specified in FIG. 2. In FIG. 2, different anti-friction layers of two-element bearings are plotted on the X axis, these anti-friction layers being provided on the concave side of a steel base shell, i.e. the side directed towards the part which is to be rotatably mounted, for example a shaft. The alloys The standard alloy AlZn4SiPb also exhibits only a small number of passed components (ca. 40%) and the variation range is also very large, which means that this standard aluminium alloy is suitable as an anti-friction layer in two-element bearings under certain conditions only.

By contrast, the two alloys AlZn4Si3 (proposed by the invention) and AlZn4Si5 exhibit a very narrow variation range compared with the anti-friction layer AlSn20Cu, that of the aluminium layer proposed by the invention being narrower than the AlZn4Si5 alloy known from the prior art, and the number of specimens fatigue-tested without rupture is also significantly higher (67% in the case of AlZn4Si3 and 50% for AlZn4Si5).

The layer thickness of the bearing layer was between 0.350 mm and 0.420 mm in the case of all said two-element bearings and the roughness was in the range of between 2 $\mu$m and 3.2 $\mu$m.

10 specimens were tested respectively and the maximum seizure limit load standardised in line with the two-element bearing using AlSn20Cu aluminium alloy.

Naturally, the above compositions of the aluminium alloys proposed by the invention listed in the table as well as other compositions may be used for the two-element bearings, in which case the proportions of the elements will be within the specified ranges.

It is very clear from the two diagrams given in FIG. 1 and FIG. 2 that the aluminium alloy proposed by the invention exhibits a significant improvement on the prior art both for solid bearings and for composite bearings and in the case of composite bearings with pure anti-friction type layers such as AlSn20Cu.

In view of these mechanical profiles of the aluminium alloy, however, they could also be used as a binding layer for a multi-layer plain bearing. This being the case, the plain bearings may be annular bearing elements or half-shells of the type known from the prior art or the aluminium alloy may be used to make thrust rings. Consequently, the aluminium alloy advantageously finds universal applications.

In multi-layer composite materials used for anti-friction elements, in particular comprising three layers, the anti-friction layer may be made from the following alloys, the binding layer respectively being an aluminium alloy proposed by the invention:

1. Bearing metals with an aluminium base (in accordance with DIN ISO 4381 or 4383):
   AlSn6CuNi, AlZn5SiCuPbMg, AlSn20Cu, AlSi4Cd, AlCd3CuNi, AlSi11Cu, AlSn6Cu, AlSn40, AlSn25CuMn, AlSi11CuMgNi, AlZn4SiPb;
2. Bearing metals with a copper base (in accordance with DIN ISO 4383):
   CuPb10Sn10, CuSn10, CuPb15Sn7, CuPb20Sn4, CuPb22Sn2, CuPb24Sn4, CuPb24Sn, CuSn8P, CuPb5Sn5Zn, CuSn7Pb7Zn3, CuPb10Sn10, CuPb30;
3. Bearing metals with a lead base:
   PbSb10Sn6, PbSb15Sn10, PbSb15SnAs, PbSb14Sn9CuAs, PbSn10Cu2, PbSn18Cu2, PbSn10TiO2, PbSn9Cd, PbSn10;
4. Bearing metals with a tin base:
   SnSb8Cu4, SnSb12Cu6Pb.

Naturally, bearing metals with a base of aluminium, copper, lead or tin other than those listed above may also be used.

Another option is to use organic substances as the anti-friction layer, such as lubricating varnishes or polymer substances for example, such as heat-deformable plastics, for example polyamide (PA) 66, polyamide (PA) 6, cast polyamide 6, cast polyamide 12, polyamide 610, polyoxymethylene, polyethylene terephthalate, polybutylene terephthalate or similar.

The bearing layers may also be applied by galvanic processes such as sputtering, rolling, plating, electro-plating, for example, by spraying or similar, and may be applied on top of existing layers comprising the base shell, e.g. made from steel, bronze or similar, and a binding layer disposed on top of it. In the case of arrangements comprising the binding layer on the base shell, at least some of the same embodiments will essentially apply.

Not only can the aluminium alloy proposed by the invention be used as a binding and anti-friction layer for three-element bearings, these bearings may also be made up of more than three layers, for example by providing diffusion barrier layers, made of Al, Ni or similar, for example.

What is claimed is:

1. Aluminium alloy for an anti-friction element containing, by weight, 4.2% to 4.8% Zn, 3.0% to 7.0% Si, 0.8% to 1.2% Cu, 0.7% to 1.3% Pb, 0.12% to 0.18% Mg, 0% to 0.3% Mn and 0% to 0.2% Ni, characterised in that it additionally contains, by weight, 0.05% to 0.1% Zr, 0% to 0.05% Ti, 0% to 0.4% Fe, 0% to 0.2% Sn, and the rest is Al with the usual incidental impurities depending on the melt.

2. Anti-friction element made from an aluminium alloy, characterised in that the aluminium alloy is of the type defined in claim 1.

3. Composite material for an anti-friction element comprising a base layer and a second layer made from an aluminium alloy arranged thereon, characterised in that the aluminium alloy is of the type defined in claim 1.

4. Composite material as claimed in claim 3, characterised in that the second layer is provided as an anti-friction layer of a plain bearing.

5. Composite material as claimed in claim 3, characterised in that the second layer is provided as a binding layer of a plain bearing.

6. Composite material as claimed in claim 3, characterised in that an anti-friction layer is provided on the second layer, the anti friction layer being selected from a group consisting of bearing metals with an aluminium base, bearing metals with a copper base, bearing metals with a tin base, bearing alloys with a lead base, a lubricating varnish, and a polymer layer.

7. Method of producing an aluminium alloy for an anti-friction element in which, by weight, 4.2% to 4.8% Zn, 3.0% to 7.0% Si, 0.8% to 1.2% Cu, 0.7% to 1.3% Pb, 0.12% to 0.18% Mg, 0% to 0.3% Mn and 0% to 0.2% Ni are admixed with Al and the usual incidental impurities depending on the melt, characterised in that by weight, between 0.05% and 0.1% Zr, 0% to 0.05% Ti, 0% to 0.4% Fe, 0% to 0.2% Sn are added and the mixture is melted.

8. Composite material according to claim 3, wherein the base layer is made from steel.

* * * * *